(12) United States Patent
Sugiura

(10) Patent No.: US 9,409,256 B2
(45) Date of Patent: Aug. 9, 2016

(54) LASER PROCESSING METHOD

(75) Inventor: Ryuji Sugiura, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 816 days.

(21) Appl. No.: 13/701,031

(22) PCT Filed: May 20, 2011

(86) PCT No.: PCT/JP2011/061674
§ 371 (c)(1),
(2), (4) Date: Nov. 30, 2012

(87) PCT Pub. No.: WO2011/152230
PCT Pub. Date: Dec. 8, 2011

(65) Prior Publication Data
US 2013/0068739 A1    Mar. 21, 2013

(30) Foreign Application Priority Data
Jun. 2, 2010  (JP) .................................. 2010-127045

(51) Int. Cl.
*B23K 26/38*   (2014.01)
*B23K 26/00*   (2014.01)
*B23K 26/40*   (2014.01)

(52) U.S. Cl.
CPC ............. *B23K 26/38* (2013.01); *B23K 26/0057* (2013.01); *B23K 26/0622* (2015.10); *B23K 26/40* (2013.01); *B23K 2201/40* (2013.01); *B23K 2203/50* (2015.10)

(58) Field of Classification Search
CPC ........... B23K 26/0057; B23K 26/0063; B23K 26/38; B23K 26/4075; B23K 2201/40

USPC ............. 219/121.61, 121.67, 121.68, 121.69, 219/21.85; 372/25, 26, 30, 38.01
See application file for complete search history.

(56) References Cited

U.S. PATENT DOCUMENTS 5,580,470 A    12/1996  Enokizono et al.
7,173,212 B1 *  2/2007  Semak ............... B23K 26/0604
                                              219/121.61

(Continued)

FOREIGN PATENT DOCUMENTS

CN    1498067    5/2004
CN    101617448  12/2009

(Continued)

*Primary Examiner* — Thien S Tran
(74) *Attorney, Agent, or Firm* — Drinker Biddle & Reath LLP

(57) ABSTRACT

To provide a laser processing method which is capable of enhancing the dividing performance according to a required quality. By irradiating an object to be processed with a laser light L having a pulse waveform in which its half width and its bottom width are equal to one another, a plurality of modified spots are formed along a line to cut inside the object, and a modified region is formed with the plurality of modified spots. Here, a laser light source 101 controls a drive power source 51 by a laser light source controller 102, to switch among a pulse waveform among first to third pulse waveforms according to a PE value of the laser light L. In the case of a low PE value, a first pulse waveform formed such that a peak value is located on its first half side and into a saw-blade shape is set as the pulse waveform, and in the case of a high PE value, a second pulse waveform formed such that a peak value is located on its latter half side and into a saw-blade shape is set as the pulse waveform.

16 Claims, 20 Drawing Sheets

(56) References Cited

U.S. PATENT DOCUMENTS

| | | | |
|---|---|---|---|
| 7,491,909 B2* | 2/2009 | Yamamoto | B23K 26/063 219/121.61 |
| 2002/0195433 A1* | 12/2002 | Troitski | B23K 26/0057 219/121.69 |
| 2005/0226287 A1* | 10/2005 | Shah | G01J 11/00 372/25 |
| 2006/0016790 A1 | 1/2006 | Yeik | |
| 2008/0217312 A1 | 9/2008 | Tokura | |
| 2009/0120924 A1* | 5/2009 | Moffatt | B23K 26/0626 219/385 |
| 2009/0245301 A1* | 10/2009 | Peng | B23K 26/063 372/25 |
| 2009/0245302 A1* | 10/2009 | Baird | B23K 26/063 372/25 |
| 2009/0261083 A1 | 10/2009 | Osajima et al. | |
| 2010/0118899 A1* | 5/2010 | Peng | H01S 3/06754 372/25 |
| 2010/0177794 A1* | 7/2010 | Peng | B23K 26/0635 372/25 |
| 2010/0246611 A1* | 9/2010 | Sun | B23K 26/063 372/18 |
| 2010/0276405 A1* | 11/2010 | Cho | B23K 26/063 219/121.72 |

FOREIGN PATENT DOCUMENTS

| | | |
|---|---|---|
| JP | 2006-108459 | 4/2006 |
| JP | 2008-087053 | 4/2008 |
| JP | 2008-246578 | 10/2008 |
| TW | 200735992 | 10/2007 |
| WO | WO 2005/099957 | 10/2005 |
| WO | 2010/116917 | 10/2010 |

* cited by examiner

Fig.8
(a)
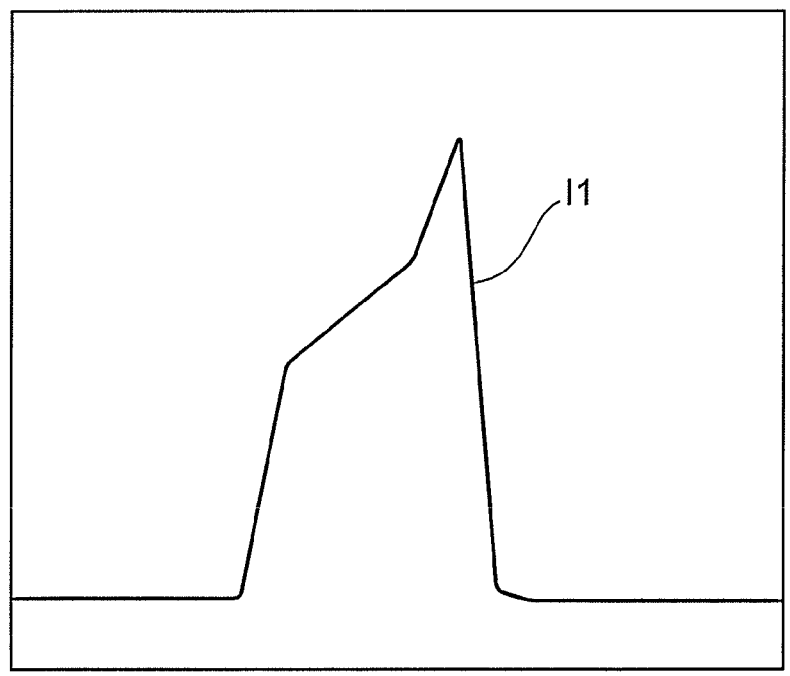
(b)
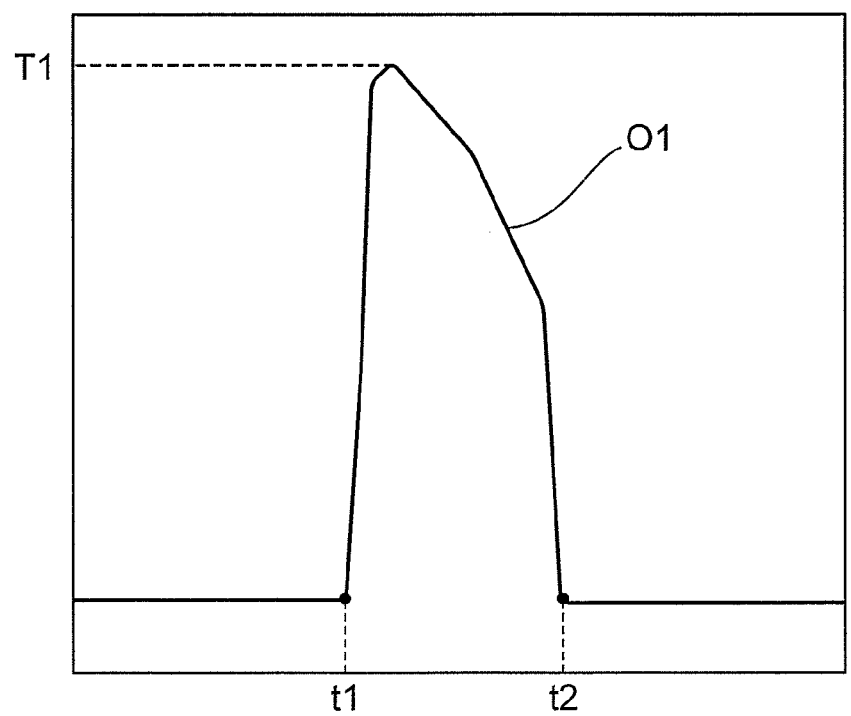

Fig.9
(a)
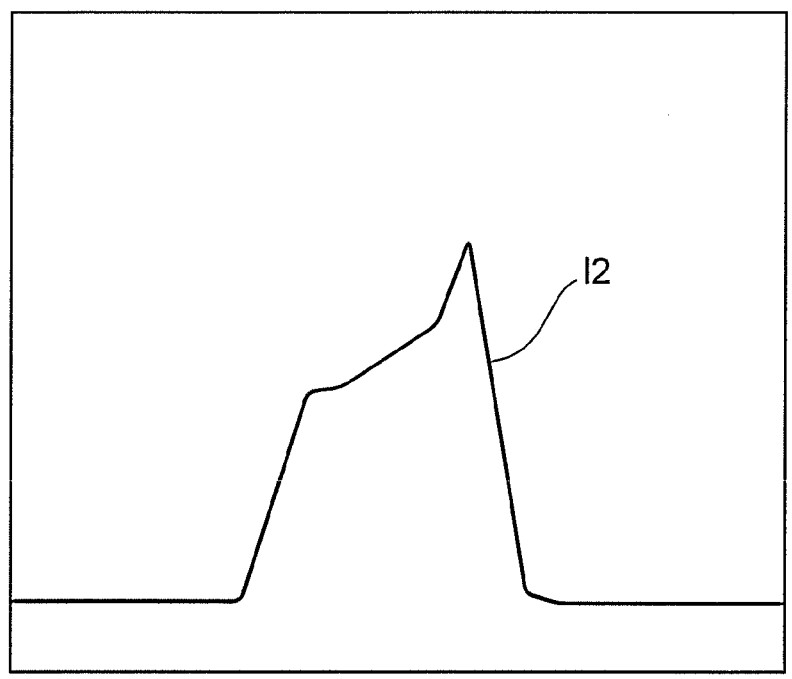
(b)
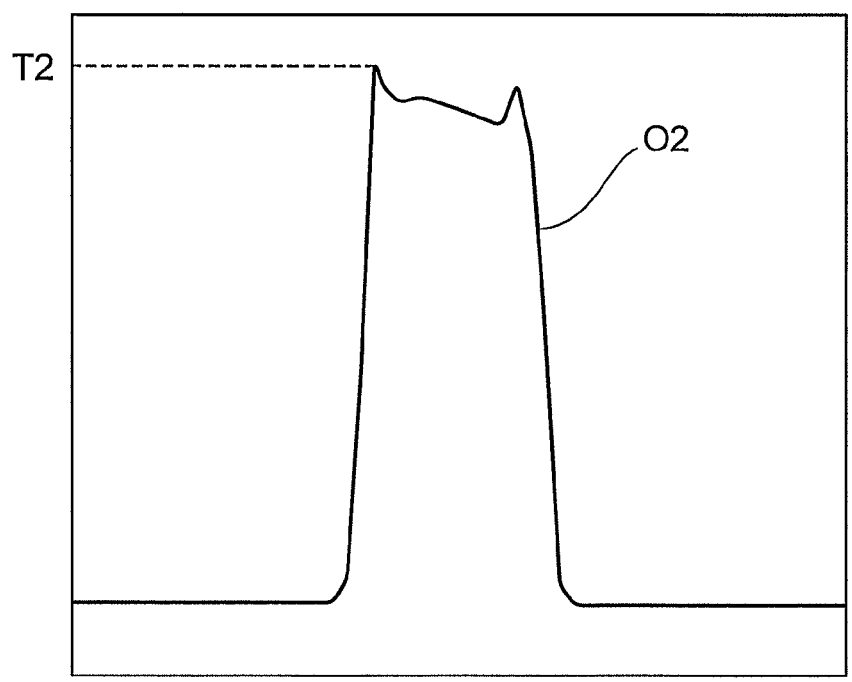

Fig.10
(a)
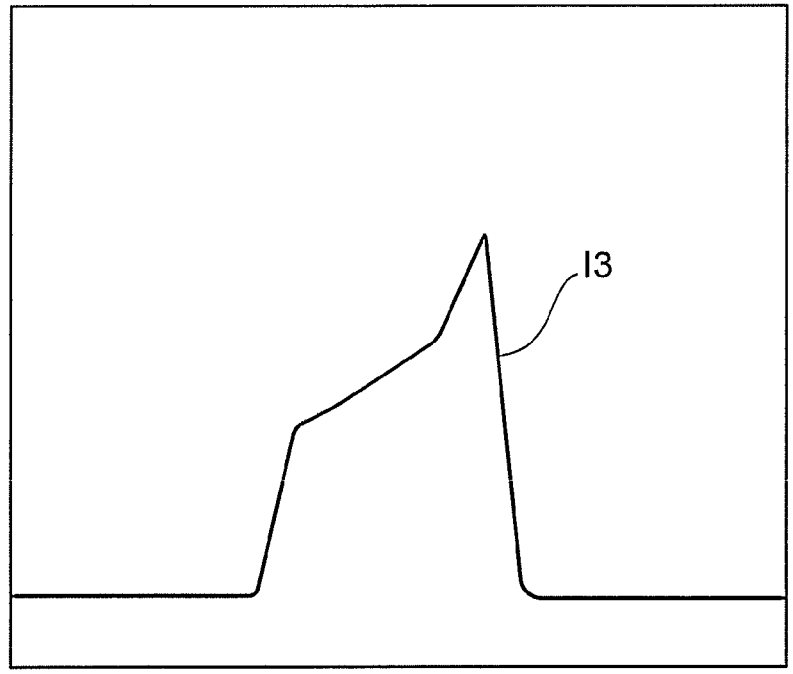
(b)
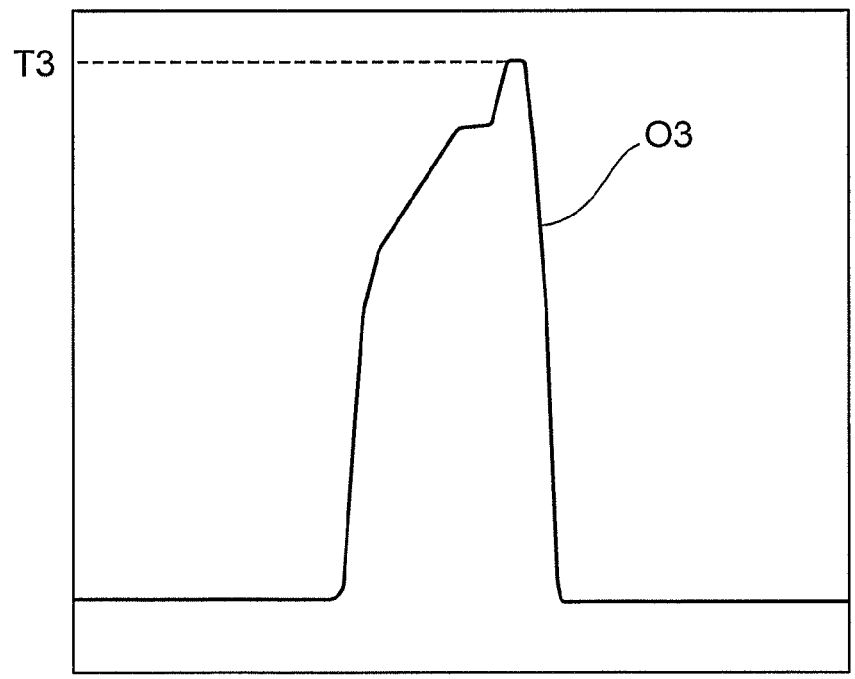

Fig.11
(a)
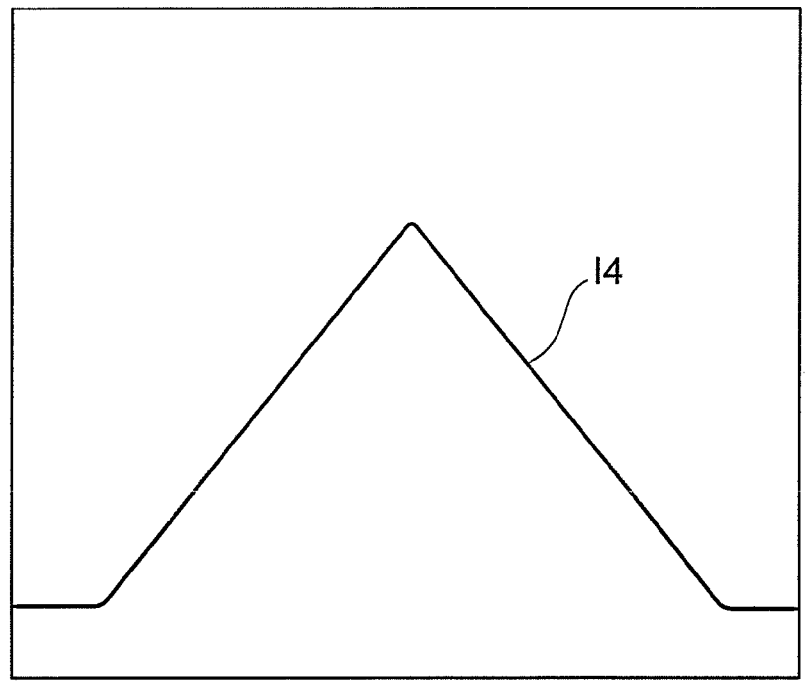
(b)
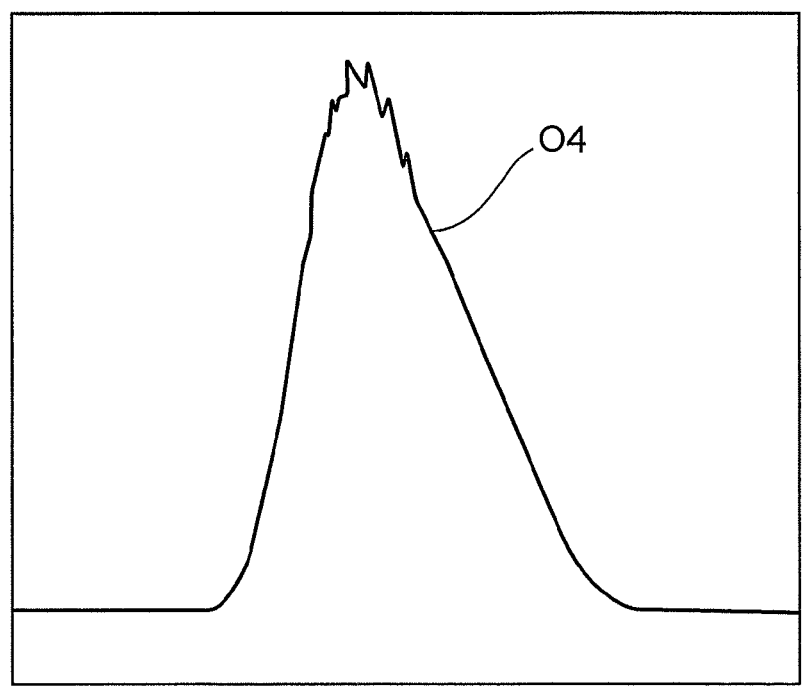

Fig.12
(a)
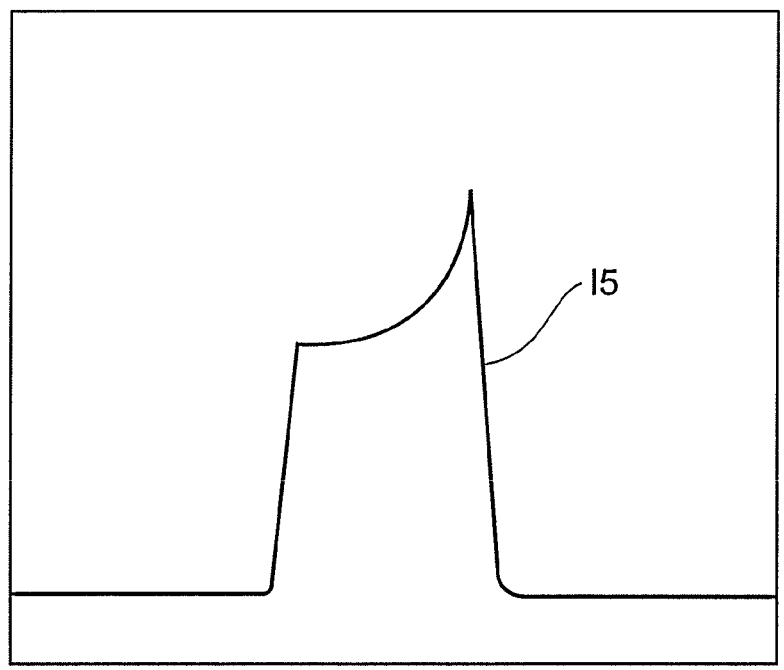
(b)
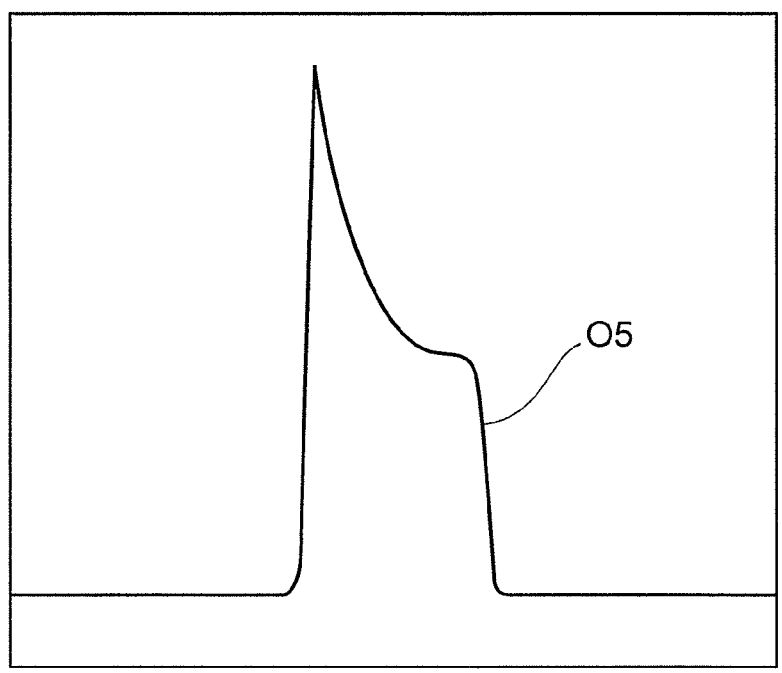

Fig.13

| | PULSE PITCH (μm) | | | | | | | | | | | | |
|---|---|---|---|---|---|---|---|---|---|---|---|---|---|
| | 1.2~3.8 | 4.0 | 4.2 | 4.4 | 4.6 | 4.8 | 5.0 | 5.2 | 5.4 | 5.6 | 5.8 | 6.0 |
| COMPARATIVE EXAMPLE 1 (PULSE WAVEFORM O4) | FC | FC | FC | FC | FC | FC | ST | ST | ST | ✕ | ✕ | ✕ |
| COMPARATIVE EXAMPLE 2 (PULSE WAVEFORM O5) | FC | FC | FC | ST | ST | ST | ST | ✕ | ✕ | ✕ | ✕ | ✕ |
| EXAMPLE 1 (FIRST PULSE WAVEFORM O1) | FC | FC | FC | FC | FC | FC | FC | FC | FC | FC | FC | FC |
| EXAMPLE 2 (SECOND PULSE WAVEFORM O2) | FC | FC | FC | FC | FC | FC | FC | FC | FC | FC | FC | FC |
| EXAMPLE 3 (THIRD PULSE WAVEFORM O3) | FC | FC | FC | FC | FC | FC | FC | FC | FC | FC | FC | FC |

Fig.14
(a)
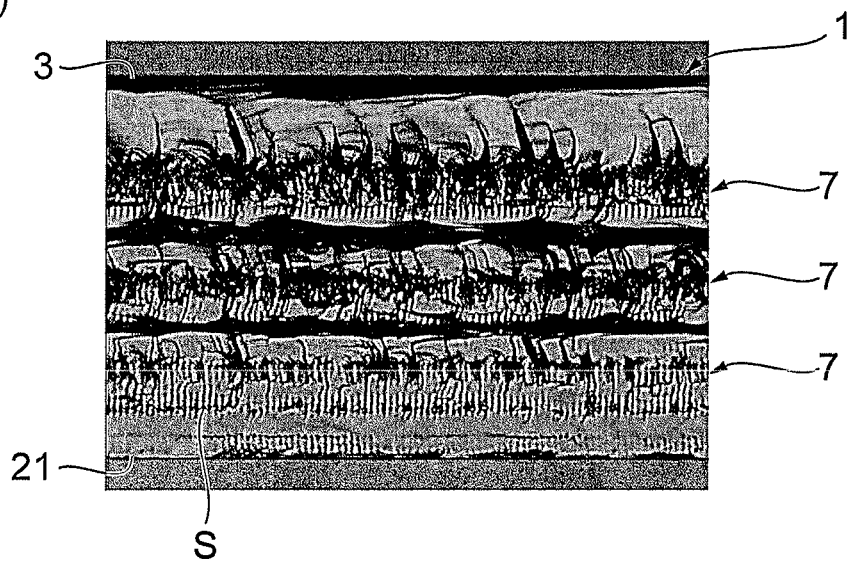
(b)
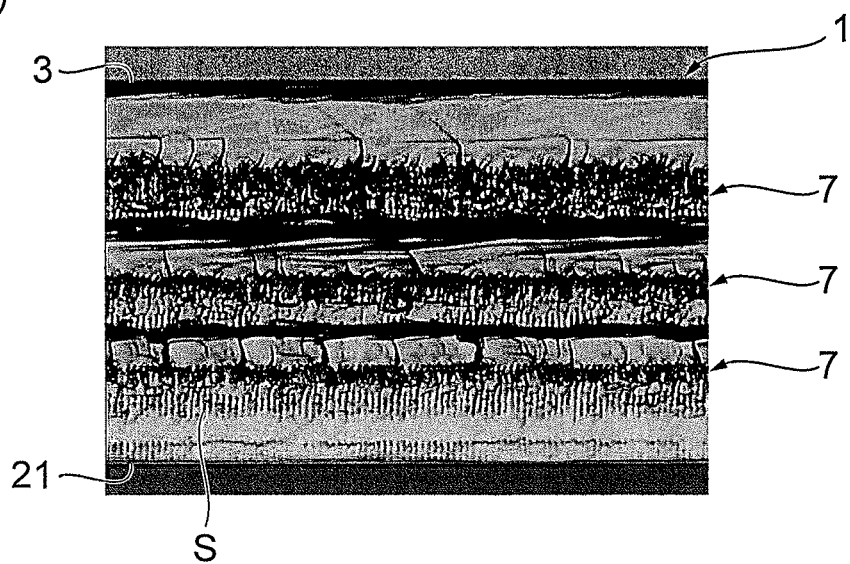

Fig.16

| | \multicolumn{15}{c}{PULSE PITCH (μm)} |
| --- | --- | --- | --- | --- | --- | --- | --- | --- | --- | --- | --- | --- | --- | --- | --- |
| | 0.5 | 1.0 | 1.2 | 1.4 | 1.6 | 1.8 | 2.0 | 2.2 | 2.4 | 2.6 | 2.8 | 3.0 | 3.2 | 3.6 | 3.8 |
| EXAMPLE 1 (FIRST PULSE WAVEFORM 01) | BHC | FC | FC | FC | FC | FC | FC | FC | FC | FC | FC | FC | FC | ST | × |
| EXAMPLE 2 (SECOND PULSE WAVEFORM 02) | BHC | BHC | BHC | FC | FC | FC | FC | FC | FC | FC | FC | ST | ST | × | × |
| EXAMPLE 3 (THIRD PULSE WAVEFORM 03) | BHC | BHC | BHC | BHC | BHC | BHC | FC | FC | FC | FC | ST | ST | ST | × | × |

*Fig.17*
(a)
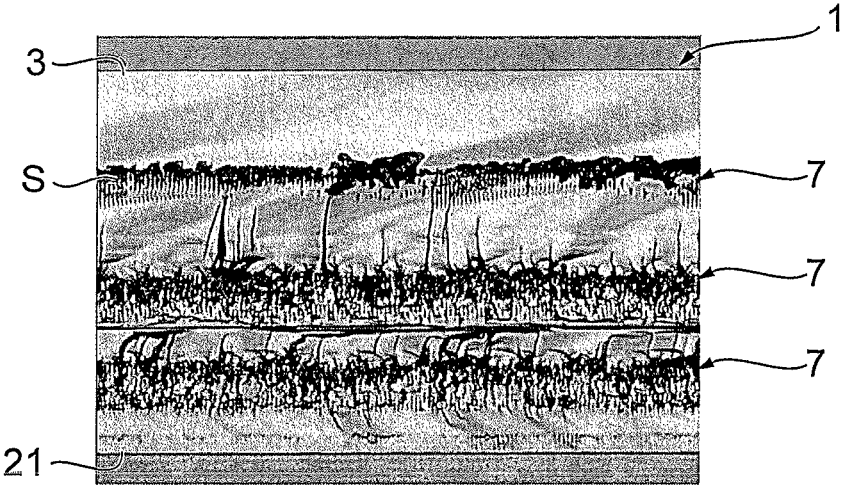
(b)
(c)
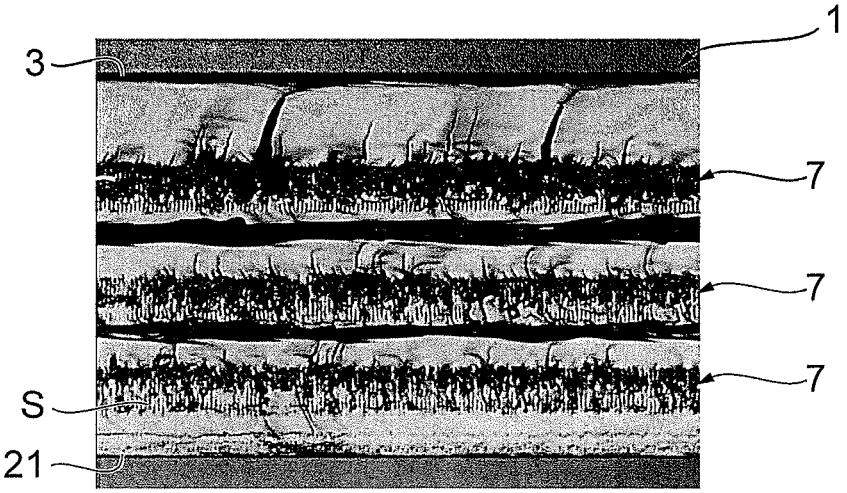

Fig.18

| | 0.5 | 1.0 | 1.2~2.6 | 2.8 | 3.0 | 3.2 | 3.6 | 3.8 | 4.0 | 4.2 | 4.4 | 4.6 | 4.8 | 5.0 |
|---|---|---|---|---|---|---|---|---|---|---|---|---|---|---|
| | | | | | | PULSE PITCH (μm) | | | | | | | | |
| EXAMPLE 1 (FIRST PULSE WAVEFORM 01) | ST | FC | FC | ✕ | ✕ | ✕ | ✕ | ✕ | ✕ | ✕ | ✕ | ✕ | ✕ | ✕ |
| EXAMPLE 2 (SECOND PULSE WAVEFORM 02) | ST | FC | FC | ✕ | ✕ | ✕ | ✕ | ✕ | ✕ | ✕ | ✕ | ✕ | ✕ | ✕ |
| EXAMPLE 3 (THIRD PULSE WAVEFORM 03) | BHC | FC | FC | FC | FC | FC | FC | FC | FC | FC | FC | FC | ST | ST |

LASER PROCESSING METHOD

TECHNICAL FIELD

The present invention relates to a laser processing method for cutting an object to be processed.

BACKGROUND ART

As a conventional laser processing method, a method for collecting a laser light on an object to be processed, to form a modified region along a line to cut in the object is known (refer to Patent Literature 1, for example). In such a laser processing method, a plurality of modified spots are formed along a line to cut, to form a modified region with these plurality of modified spots.

CITATION LIST

Patent Literature

Patent Literature 1: Japanese Patent Application Laid-Open No. 2006-108459

SUMMARY OF INVENTION

Technical Problem

Here, in laser processing methods in recent years, for example, in some cases, pulse energy of a laser light is changed according to the required quality. However, in this case, in the laser processing method described above, the dividing performance which is easiness of extension of fractures generated from the modified region may be lowered, that may worsen productivity (takt time).

Therefore, an object of the present invention is to provide a laser processing method which is capable of enhancing the dividing performance according to a required quality.

Solution to Problem

In order to solve the above-described object, the inventors dedicated themselves to continuous study. As a result, the inventors obtained findings that, provided that an object to be processed is irradiated with a laser light having a pulse waveform in which its half width and a time width from its rise to fall (so-called "bottom width") are equal to one another, to form a modified region, it is possible to enhance the dividing performance. Then, the inventors further dedicated themselves to continuous study, and additionally found that, in the case where the pulse energy of a laser light is changed, the dividing performance differs according to a pulse waveform of the laser light. Then, the inventors reached the conclusion that, provided that a pulse waveform in which its half width and its bottom width are equal to one another is optimized according to pulse energy, it is possible to obtain the high dividing performance according to a required quality, and accomplished the present invention.

That is, a laser processing method according to the present invention for forming a modified region along a line to cut in the object by collecting a laser light onto an object to be processed, the method includes a modified region forming step of forming a plurality of modified spots along the line by irradiating the object with the laser light having a pulse waveform in which its half width and a time width from a rise to a fall are equal to one another, to form the modified region with the plurality of modified spots, and in which, in the modified region forming step, in the case where pulse energy of the laser light is at a first value lower than a predetermined value, a first pulse waveform formed such that a peak value is located on its first half side and into a saw-blade shape is set as the pulse waveform, and in the case where the pulse energy is at a second value higher than the predetermined value, a second pulse waveform formed such that a peak value is located on its latter half side and into a saw-blade shape is set as the pulse waveform.

In the laser processing method according to the present invention, the object is irradiated with a laser light having a pulse waveform in which its half width and its bottom width are equal to one another. Then, at this time, for example, in the case where the pulse energy is at the first value or the second value according to a required quality, the first pulse waveform or the second pulse waveform is respectively set as the pulse waveform. Therefore, the pulse waveform is optimized according to the pulse energy so as to enhance the dividing performance. This is because it is found that, the saw-blade shaped first pulse waveform in which a peak value is positioned on the first half side has the high dividing performance in the case where the pulse energy is at the first value, and the saw-blade shaped second pulse waveform in which a peak value is positioned on the latter half side has the high dividing performance in the case where the pulse energy is at the second value. Accordingly, in accordance with the present invention, it is possible to enhance the dividing performance according to a required quality.

Here, the first pulse waveform may be a waveform which steeply rises to reach a peak value, and thereafter gradually declines, and thereafter steeply falls. The second pulse waveform may be a waveform which steeply rises, and thereafter gradually ascends to reach a peak value, and thereafter steeply falls. Further, in the modified region forming step, in the case where the pulse energy is at the predetermined value, a third pulse waveform formed into a rectangular form may be set as the pulse waveform.

Further, in the modified region forming step, in the case where the modified spots are formed on an opposite surface side of a laser light irradiated surface in the object, the pulse energy is preferably at the first value. In this case, it is possible to inhibit damage from being caused on the opposite surface of the laser light irradiated surface in the object by irradiation of the laser light.

Further, in the modified region forming step, in the case where the modified spots are formed on the opposite surface side of the laser light irradiated surface in the object, the pulse energy is preferably at the second value. In this case, it is possible to reliably expose the fractures on the opposite surface of the laser light irradiated surface in the object.

Advantageous Effects of Invention

In accordance with the present invention, it is possible to enhance the dividing performance according to a required quality.

BRIEF DESCRIPTION OF DRAWINGS

FIG. 8 are charts showing a first pulse waveform of the present embodiment.

FIG. 9 are charts showing a second pulse waveform of the present embodiment.

FIG. 10 are charts showing a third pulse waveform of the present embodiment.

FIG. 11 are charts showing a pulse waveform according to a comparative example 1.

FIG. 12 are charts showing a pulse waveform according to a comparative example 2.

FIG. 13 is a table showing the relationship between pulse waveforms and dividing performances.

FIG. 14A is a photographic diagram showing a plane of section of the object according to the comparative example 1, and FIG. 14B is a photographic diagram showing a plane of section of the object according to the comparative example 2.

FIG. 16 is a table showing the relationship between pulse waveforms and dividing performances when pulse energy is at a low PE value.

FIG. 17A is a photographic diagram showing a plane of section of the object according to the example 1 when pulse energy is at a low PE value, FIG. 17B is a photographic diagram showing a plane of section of the object according to the example 2 when pulse energy is at a low PE value, and FIG. 17C is a photographic diagram showing a plane of section of the object according to the example 3 when pulse energy is at a low PE value.

FIG. 18 is a table showing the relationship between pulse waveforms and dividing performances when pulse energy is at a high PE value.

DESCRIPTION OF EMBODIMENTS

Figure 1:
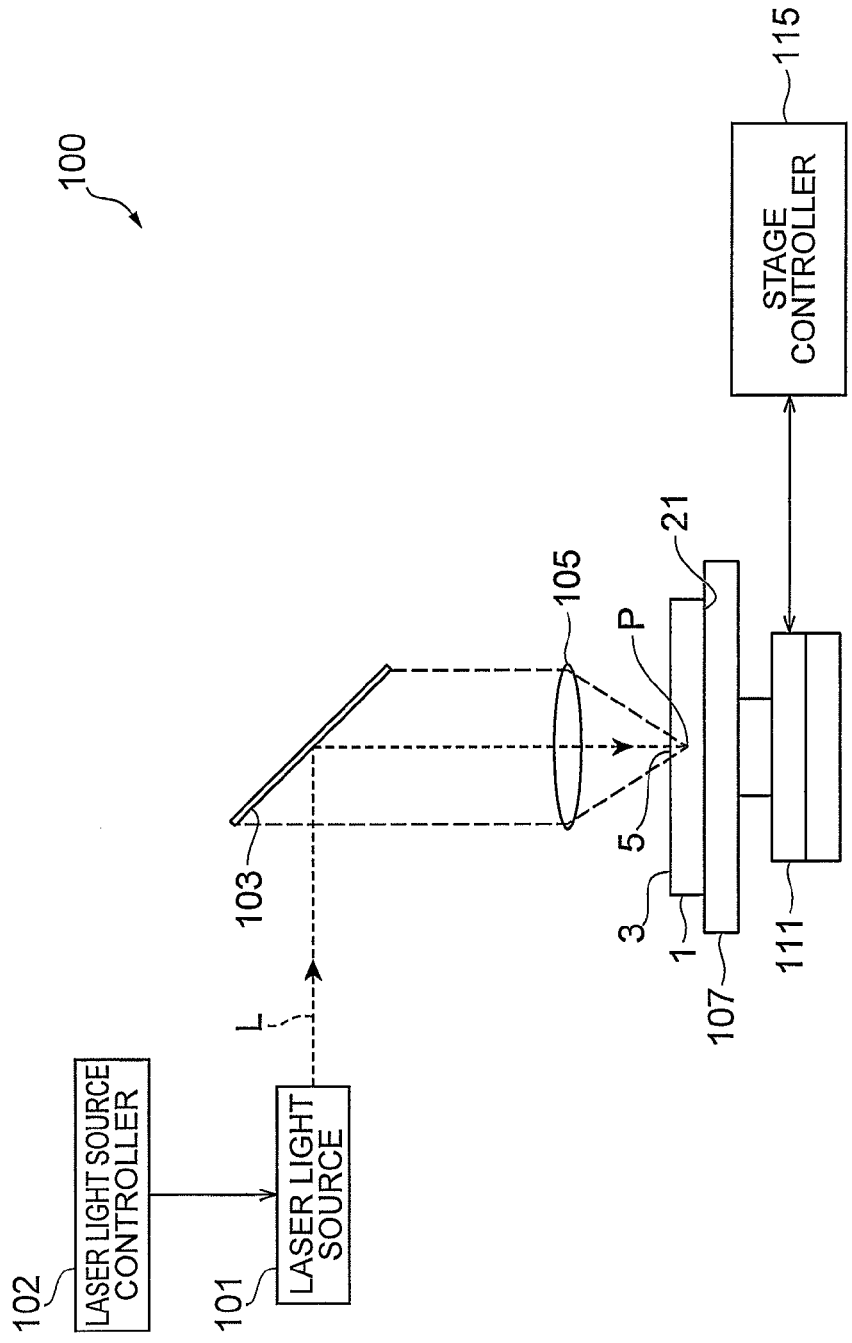
FIG. 1 is a schematic block diagram of a laser processing apparatus used for forming a modified region.

Hereinafter, preferred embodiments of the present invention will be described in detail with reference to the drawings. In addition, the same or corresponding components in the respective drawings are denoted by the same reference numerals and letters, and overlapping descriptions thereof will be omitted.

In a laser processing method according to the present embodiment, a laser light is collected on an object to be processed, to form a plurality of modified spots along a line to cut inside the object, and a modified region serving as a starting point of cutting is formed with these plurality of modified spots. Then, first, the formation of a modified region will be described with reference to FIGS. 1 to 6.

As shown in FIG. 1, a laser processing apparatus 100 is equipped with a laser light source 101 that performs pulsed oscillation of a laser light L, a dichroic mirror 103 which is disposed so as to change the optical axis (optical path) of the laser light L in direction by 90 degrees, and a collecting lens 105 for collecting the laser light L. Further, the laser processing apparatus 100 is equipped with a supporting base 107 for supporting an object to be processed 1 irradiated with the laser light L collected by the collecting lens 105, a stage 111 for moving the supporting base 107, a laser light source controller 102 that controls the laser light source 101 in order to adjust an output, a pulse width, a pulse waveform, and the like of the laser light L, and a stage controller 115 that controls the movement of the stage 111.

In this laser processing apparatus 100, the laser light L emitted from the laser light source 101 is changed in direction of its optical axis by 90 degrees by the dichroic mirror 103, and is collected inside the object 1 placed on the supporting base 107 by the collecting lens 105. At the same time, the stage 111 is moved, to relatively move the object 1 along a line to cut 5 with respect to the laser light L. Thereby, a modified region along the line 5 is formed in the object 1.

Figure 2:
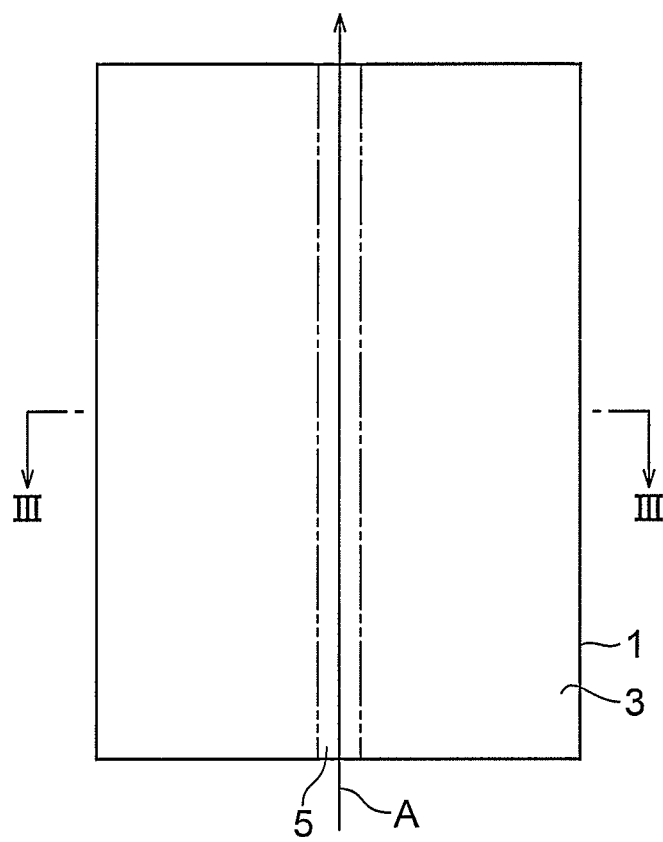
FIG. 2 is a plan view of a processing object targeted to form a modified region therein.
Figure 3:
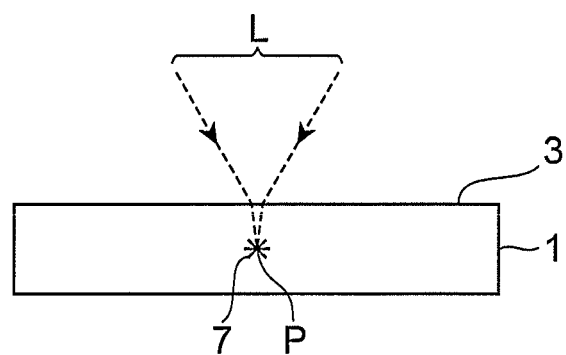
FIG. 3 is a cross-sectional view along the line III-III of the object of FIG. 2.
Figure 4:
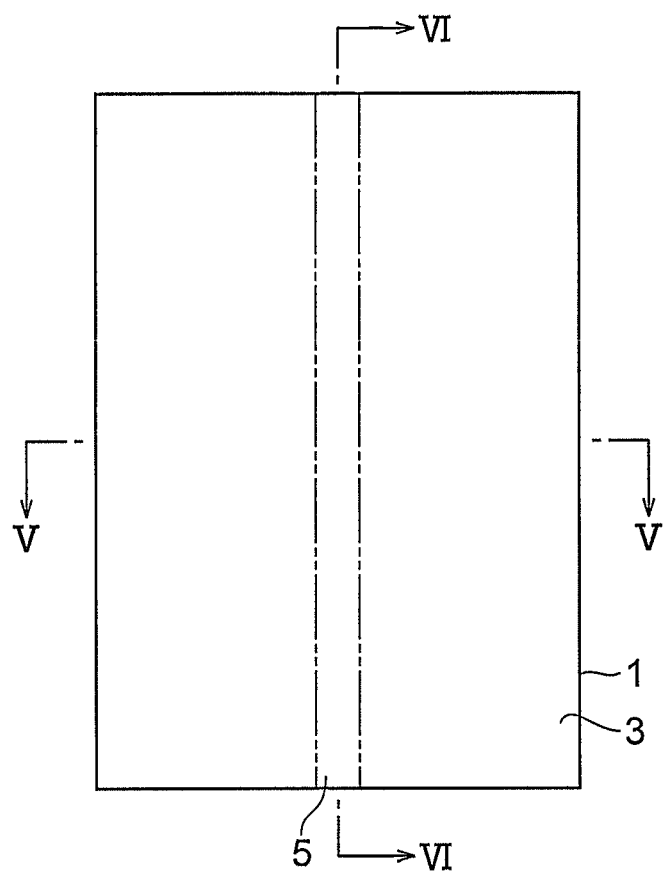
FIG. 4 is a plan view of the object after laser processing.
Figure 5:
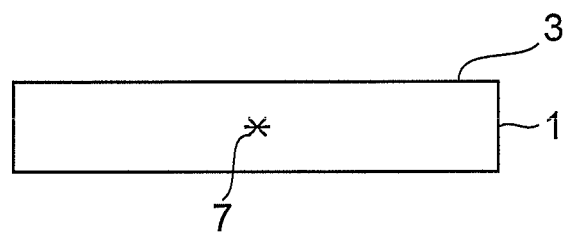
FIG. 5 is a cross-sectional view along the line V-V of the object of FIG. 4.
Figure 6:
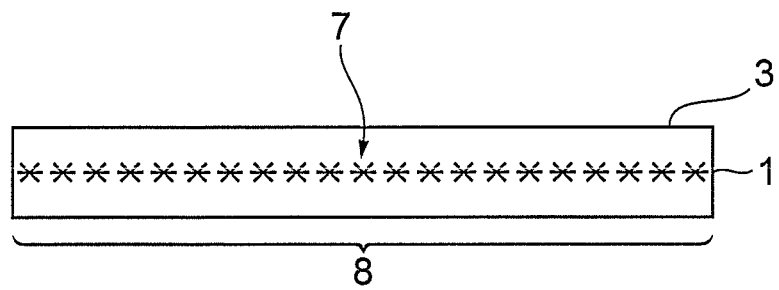
FIG. 6 is a cross-sectional view along the line VI-VI of the object of FIG. 4.

A semiconductor material, a piezoelectric material, or the like may be used as the object 1. As shown in FIG. 2, the line 5 for cutting the object 1 is set in the object 1. Here, the line 5 is a linearly-extended virtual line. In the case where a modified region is formed inside the object 1, as shown in FIG. 3, the laser light L is relatively moved along the line 5 (i.e., in the direction of arrow A in FIG. 2) in a state in which a collecting point (light collected position) P is focused on the inside of the object 1. Thereby, as shown in FIGS. 4 to 6, a modified region 7 is formed along the line 5 inside the object 1, and the modified region 7 formed along the line 5 serves as a cutting starting point region 8.

In addition, the collecting point P is a place on which the laser light L is collected. Further, the line 5 is not limited to a linear shape, and may be a curved shape, and is not limited to a virtual line, but may be a line actually drawn on a surface 3 of the object 1. Further, the modified region 7 is continuously formed in some cases, and is intermittently formed in some cases. Further, the modified region 7 may be a row form or a point form, that is, it suffices that the modified region 7 is formed at least inside the object 1. Further, fractures may be formed from the modified region 7 as a starting point in some cases, and fractures and the modified region 7 may be exposed at the outer surface (the surface 3, the rear surface 21, or the outer circumferential surface) of the object 1. Further, a laser light incidence plane at the time of forming the modified region 7 is not limited to the surface 3 of the object 1, and may be the rear surface 21 of the object 1.

Incidentally, the laser light L here is made transmissive through the object 1 and is absorbed particularly in the vicinity of the collecting point inside the object 1, and thereby forming the modified region 7 in the object 1 (i.e., internal absorption type laser processing). Therefore, the laser light L is hardly absorbed into the surface 3 of the object 1, and thus, the surface 3 of the object 1 does not melt in any case. Generally, in the case in which removal portions such as holes, grooves, and the like are melted and removed from the surface 3 to be formed (surface absorption type laser processing), a processing region gradually advances from the surface 3 side to the rear surface side.

Meanwhile, a modified region formed by the present embodiment means a region coming into a state different in density, refractive index, mechanical strength, and other physical characteristics from the circumference thereof. As a modified region, for example, there is a molten processed regions, crack regions, dielectric breakdown regions, refractive index changed regions, or the like, and there is a region where these are mixed as well. Moreover, as a modified region, there is a region in which the density of a modified region is changed as compared with the density of an unmodified region in a material of an object to be processed, or a region in which a lattice defect is formed (these may be collectively called a high-density transitional region).

Further, in some cases, a melt processing region, a refractive index change region, a region in which the density of a modified region is changed as compared with the density of an unmodified region, and a region in which a lattice defect is formed may further contain a fracture (cut or microcrack) inside those regions or in the interface between the modified region and the unmodified region. Fractures to be contained may spread over the entire surface of the modified region or may be formed in only one portion or a plurality of portions in some cases. As the object 1 is, for example, an object consisting of silicon, glass, $LiTaO_3$, or sapphire ($Al_2O_3$), or an object composed of those may be cited.

Further, in the present embodiment, the modified region 7 is formed by forming the plurality of modified spots (processing trace) along the line 5. The modified spots are modified portions formed by one-pulse shot of a pulse laser light (i.e., one-pulse laser irradiation: laser shot), and the modified spots are collected to become the modified region 7. As modified spots, crack spots, molten processed spots, refractive index changed spots, and those in which at least one of them is mixed.

With respect to this modified spot, it is preferable to appropriately control its sizes and lengths of fractures generated in consideration of a required cutting accuracy, a required flatness of its plane of section, a thickness, a type, a crystallite orientation, and the like of an object to be processed.

Next, embodiments according to the present invention will be described in detail.

Figure 7:
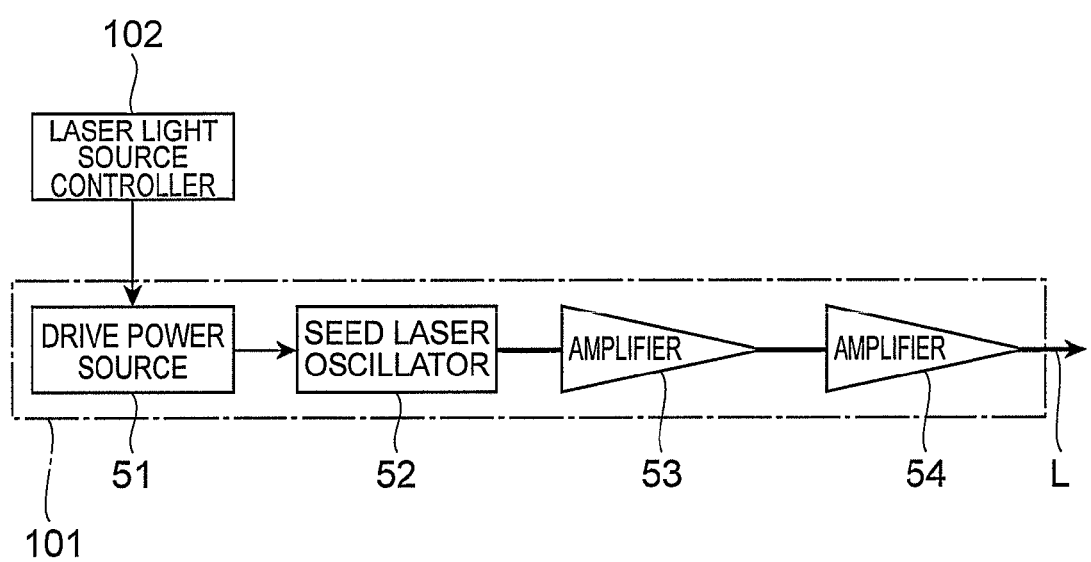
FIG. 7 is a block diagram showing a laser light source of a present embodiment.

FIG. 7 is a block diagram showing a laser light source of the present invention. As shown in FIG. 7, as the laser light source 101 of the present embodiment, a MOPA (Master Oscillator Power Amplifier) system pulse fiber laser is used. This laser light source 101 is composed of a drive power source 51, a seed laser oscillator 52, and amplifiers 53 and 54.

The drive power source 51 is for driving the seed laser oscillator 52, and inputs a driving current having a predetermined input pulse waveform to the seed laser oscillator 52. This drive power source 51 is connected to a laser light source controller 102, and is to be capable of changing a shape of an input pulse waveform.

The seed laser oscillator 52 is a diode laser (LD), and pulse-oscillates a seed laser light having a pulse waveform equal to an input pulse waveform of the input driving current. The amplifiers 53 and 54 amplify the seed laser light oscillated by the seed laser oscillator 52 in this order, to emit it as a laser light L. The amplifiers 53 and 54 amplify the seed laser light with a plurality of LDs different from the seed laser oscillator 52. Further, in these amplifiers 53 and 54, the pulse waveform of the seed laser light from the seed laser oscillator 52 is deformed in its amplification process, to emit the laser light L having a pulse waveform different from the input pulse waveform.

In the laser light source 101, the drive power source 51 is controlled by the laser light source controller 102, to switch (control) an input pulse waveform of a driving current input to the seed laser oscillator 52 on the basis of the pulse energy of the laser light L, thereby setting and emitting the laser lights L having first to third pulse waveforms different from one another according to the pulse energy of the laser lights L. In addition, it is possible to adjust the pulse energy by use of an energy adjusting optical component (not shown) such as an attenuator.

Specifically, in the case where a pulse energy value (Pulse Energy: hereinafter called "PE value") is set to a law PE value (first value) lower than a normal PE value (predetermined value) in normal laser processing, as shown in FIG. 8B for example, the laser light source 101 sets a first pulse waveform O1 in which its half width and bottom width are equal to one another, to emit a laser light L having the first pulse waveform O1. In addition, in the present invention, the term "half width" means a time width during the value being ½ or more of a peak value T1 in a pulse waveform, and further, the term "bottom width" means a time width from the start of a rise t1 to the completion of a fall t2.

This first pulse waveform O1 is formed such that a peak value T1 is positioned on the first half side of the first pulse waveform O1 (i.e., on the side of the start of the rise t1 in the bottom width), to be sharp into a saw blade shape. Specifically, the first pulse waveform O1 steeply rises to reach the peak value T1, and thereafter gradually declines to be ½ of the peak value T1, and thereafter steeply falls. In the first pulse waveform O1 here, in the case where the half width is 500 nsec, a rise time from 10% to be 90% of the peak value T1 is approximately 40 nsec, and a fall time from 50% to be 10% of the peak value T1 is approximately 30 nsec.

The laser light L of this first pulse waveform O1 is generated by inputting a driving current having a first input pulse waveform I1 (refer to FIG. 8A) to the seed laser oscillator 52. The first input pulse waveform I1 is, as shown in FIGS. 8A and 8B, formed so as to be mirror-reversed with respect to the shape of the first pulse waveform O1.

Further, it is found that the relationship between the first input pulse waveform I1 and the first pulse waveform O1 is not only set according to a shape, but also heavily affected by a crest value in the rise portion. That is, a crest value in the rise portion in the first input pulse waveform I1 is high, and a crest value in the rise portion in the first pulse waveform O1 is high as well. Then, it is found that, because excited energy is largely consumed on the first half side in the first pulse waveform O1, its crest value gradually comes down on the latter half side (i.e., on the side of the completion of the fall t2 in the bottom width).

In addition, it is possible to increase a crest value in the rise portion by increasing outputs from the LDs exciting the amplifiers 53 and 54. Further, when outputs from the LDs of the amplifiers 53 and 54 are decreased, an average output is lowered. Meanwhile, it is also possible to obtain the laser light L having a pulse waveform relatively-approximate to a rectangle.

On the other hand, in the case where the pulse energy of the laser light L is set to a normal PE value, as shown in FIG. 9B for example, the laser light source 101 sets a second pulse waveform O2 in which its half width and bottom width are equal to one another, to emit a laser light L having the second pulse waveform O2. This second pulse waveform O2 is formed into a rectangular form. Specifically, the second pulse waveform O2 steeply rises to reach a peak value T2, and thereafter maintains the value substantially as it is, and thereafter steeply falls. In the second pulse waveform O2 here, in the case where the half width is 500 nsec, a rise time from 10% to be 90% of the peak value T2 is approximately 50 nsec, and a fall time from 90% to be 10% of the peak value T2 is approximately 70 nsec.

The laser light L having this second pulse waveform O2 is generated by inputting a driving current having a second input pulse waveform I2 (refer to FIG. 9A) to the seed laser oscillator 52.

On the other hand, in the case where the pulse energy of the laser light L is set to a high PE value (second value) higher than the normal PE value, as shown in FIG. 10B for example, the laser light source 101 sets a third pulse waveform O3 in which its half width and bottom width are equal to one another, to emit a laser light L having the third pulse waveform O3.

This third pulse waveform O3 is formed such that a peak value T3 is positioned on the latter half side of the third pulse waveform O3, and to be sharp into a saw blade shape. Specifically, the third pulse waveform O3 steeply rises to reach ½ of the peak value T3, and thereafter gradually rises to reach the peak value T3, and thereafter steeply falls. In the third pulse waveform O3 here, in the case where the half width is 500 nsec, a rise time from 10% to be 50% of the peak value T3 is approximately 40 nsec, and a fall time from 90% to be 10% of the peak value T3 is approximately 50 nsec.

The laser light L having the third pulse waveform O3 is generated by inputting a driving current having a third input pulse waveform I3 (refer to FIG. 10A) to the seed laser oscillator 52. The third pulse waveform O3 is, as shown in FIGS. 10A and 10B, formed into a shape which is the same as (similar to) the shape of the third pulse waveform O3.

Further, it is found that the relationship between the third input pulse waveform I3 and the third pulse waveform O3, as well, is not only set according to a shape, but also heavily affected by a crest value in the rise portion. That is, it is found that a crest value in the rise portion in the third input pulse waveform I3 is low, and a crest value in the rise portion in the third pulse waveform O3 as well is low.

Next, a case where the object 1 is processed by the laser processing method of the present embodiment will be described. In addition, here, the case where the modified regions 7 are formed in a plurality of lines in the thickness direction of the object 1 is exemplified.

First, for example, an expand tape is stuck on the rear surface 21 of the object 1, and the object 1 is placed on the stage 111. Next, a collecting point is focused on the rear surface 21 side inside the object 1, and the laser light L is relatively moved (scanned) along the line 5 while pulse-irradiating the object 1 with the surface 3 serving as a laser light irradiated surface with the laser light L. Thereby, a plurality of modified spots S (refer to FIGS. 14 and the like) are formed along the line 5 on the rear surface 21 side inside the object 1, and the modified region 7 is formed with these modified spots S (modified region formation step).

Here, it is found that, provided that the object 1 is irradiated with the laser light L having a pulse waveform in which its half width and bottom width are equal to one another in order to form the modified region 7, it is possible to enhance the dividing performance. Additionally, it is found that the laser light L having the first pulse waveform O1 has high dividing performance in the case where the pulse energy is set to a low PE value, the laser light L having the second pulse waveform O2 has high dividing performance in the case where the pulse energy is set to a normal PE value, and the laser light L having the third pulse waveform O3 has high dividing performance in the case where the pulse energy is set to a high PE value. In particular, the laser light L having the third pulse waveform O3 has a trend that fractures easily extend toward the opposite surface side (the rear surface 21 side) rather than the laser light irradiated surface (the surface 3).

Then, at the time of forming the modified region 7 on the rear surface 21 side inside the object 1 as described above, the drive power source 51 is controlled by the laser light source controller 102, to set the pulse energy of the irradiating laser light L to a high PE value, and set the pulse waveform to the third pulse waveform O3. Thereby, making the fractures easily extend toward the rear surface 21 side from the modified region 7 while enhancing dividing performance, which makes it possible to reliably obtain the fractures exposed on the rear surface 21 (so-called BHC).

Alternatively, at the time of forming the modified region 7 on the rear surface 21 side inside the object 1 as described above, the drive power source 51 is controlled by the laser light source controller 102, to set the pulse energy of the irradiating laser light L to a low PE value, and set the pulse waveform to the first pulse waveform O1. Thereby, lowering the effect of the laser light L on the rear surface 21 because the pulse energy is reduced while enhancing dividing performance, which makes it possible to suppress damage to the rear surface 21.

Next, the above-described scan with the laser light L is repeatedly performed while changing the collecting point in the thickness direction of the object 1, and the modified regions 7 along the line 5 are formed in a plurality of lines in order from the rear surface 21 to the surface 3. At this time, the pulse energy of the irradiating laser light L is set to a normal PE value, and at the same time, the pulse waveform is set to be the second pulse waveform O2. Thereby, it is possible to enhance the dividing performance.

Alternatively, the pulse energy of the irradiating laser light L is set to a high PE value, and at the same time, the pulse waveform is set to be the third pulse waveform O3. Thereby, improving the linearly-traveling characteristic of fractures extending from the modified regions 7 because of the increased pulse energy while enhancing the dividing performance, which makes it possible to enhance the quality of the plane of section. In addition, provided that the pulse energy of the laser light L is set to a high PE value, it is possible to inhibit twist-hackle.

Then, finally, the expand tape is expanded, and the object 1 is cut along the line 5 from the modified region 7 serving as a starting point for cutting. As a result, the object 1 is spaced from each other as a plurality of chips (for example, memories, ICs, light-emitting elements, light-receiving elements, or the like).

As described above, in the present embodiment, the object 1 is irradiated with the laser lights having the first to third pulse waveforms O1 to O3 in which its half widths and bottom widths are equal to one another. At this time, in the case where the pulse energy is set to a low PE value, a normal PE value, or a high PE value according to a required quality (including a processing purpose and a processing situation), the first to third pulse waveforms O1 to O3 are switched according to this value. That is, the pulse waveform of the laser light L is optimized according to the pulse energy so as to enhance the dividing performance.

Accordingly, according to the present embodiment, it is possible to differently use the first to third pulse waveforms O1 to O3 on the basis of a quality, and to cut the object 1 with high dividing performance according to the quality. In other words, it is possible to purposely control a pulse waveform of the laser light L, and to optimize the pulse waveform according to a PE value to improve the dividing performance. As a result, it is possible to improve the takt time, and decrease the number of scans.

Further, in the present embodiment, as described above, at the time of forming the modified spots S on the rear surface 21 side in the object 1, the pulse energy is set to a low PE value, and at the same time, the pulse waveform is set to be the first pulse waveform O1. In this case, it is possible to suppress damage from being caused on the rear surface 21 by irradiation of the laser light L.

Alternatively, in the present embodiment, as described above, at the time of forming the modified spots S on the rear surface 21 side in the object 1, the pulse energy is set to a high PE value, and at the same time, the pulse waveform is set to be the third pulse waveform O3. In this case, it is possible to reliably expose the fractures on the rear surface 21.

The preferred embodiments of the present invention have been described above. However, the laser processing method according to the present invention is not limited to the above-described embodiments, and may be modified within the scope of the gist disclosed in the respective claims, or may be applied to another embodiment.

For example, in the above-described embodiment, the laser light source 101 having the seed laser oscillator 52 which is an LD is used. However, a laser light source which modulates an output from a fiber laser of CW (Continuous Wave) with an AOM (AcoustoOptic Modulator: acousto-optic modulator) and makes the output pulsed may be used. In this case, it is possible to obtain the above-described pulse waveforms O1 to O3 by appropriately changing the transmittance of the AOM.

Further, in the above-described embodiment, the laser light source 101 has the two amplifiers 53 and 54. However, the number of amplifiers may be changed according to outputs finally needed for the laser light, and may be one, or three or more. Further, in the case where the object 1 is scanned several times, it is a matter of course that laser processing may be performed while changing a PE value and a pulse waveform of the laser light L for each scan.

In addition, the term "equal" in the above description is a comprehensive term including "substantially equal," and means things, for example, whose characteristics, states, conditions or the like are common (similar) to each other, and have a small difference between those.

EXAMPLES

Hereinafter, examples of the present invention will be described.

Example A

A silicon substrate with a thickness of 300 μm was prepared as an object to be processed. The object was irradiated with a laser light from the surface side, to form modified regions in three lines in the thickness direction along lines to cut. This process was executed several times while changing a pulse waveform and a pulse pitch of the laser light. Then, the dividing performances of a plurality of the objects after forming the modified regions therein were evaluated. In addition, a pulse pitch means a distance between a pair of modified spots adjacent to one another along the line to cut.

As processing conditions, a repeated frequency of the laser light was set to 100 kHz, and a bottom width (pulse width) of the laser light was set to 500 nsec. Further, the pulse energy was set to 16 μJ/pulse, that is a normal PE value.

Here, a pulse waveform according to a comparative example 1 was set to be a pulse waveform O4 which is equivalent to the pulse waveform of a laser light emitted from a normal solid-state laser light source (refer to FIG. 11B). Further, a pulse waveform according to a comparative example 2 was set to be a pulse waveform O5 in which a time width at a value less than ½ of the peak value in the vicinity of ½ of the peak value becomes a substantially rectangular form by adjusting a rise time of the pulse waveform of a laser light emitted from a MOPA fiber laser light source (refer to FIG. 12B). Further, the pulse waveform according to the example 1 was set to be the above-described first pulse waveform O1, the pulse waveform of the laser light according to the example 2 was set to be the above-described second pulse waveform O2, and the pulse waveform of the laser light according to the example 3 was set to be the above-described third pulse waveform O3.

Figure 20:
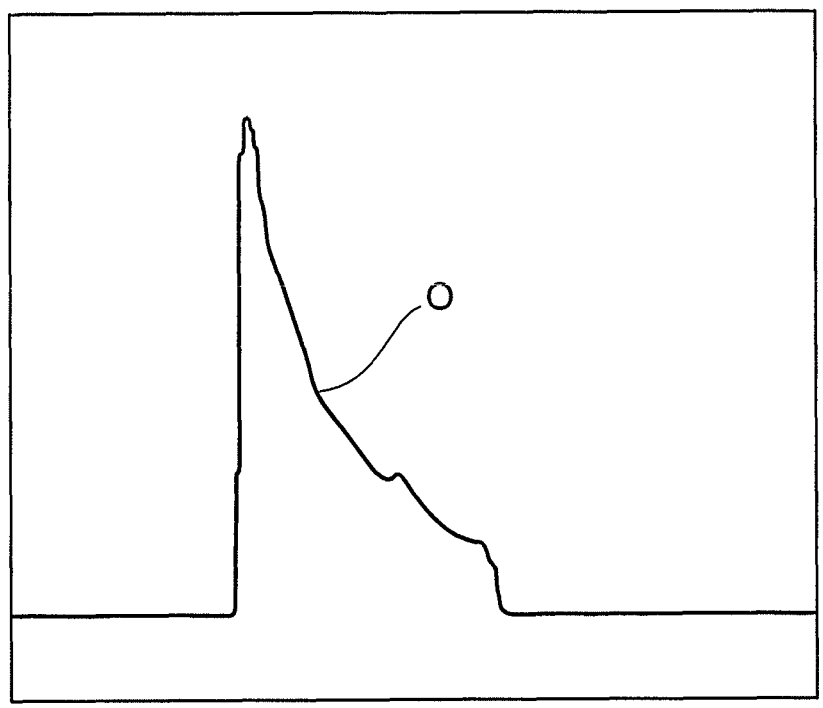
FIG. 20 is a chart showing an output pulse waveform of a normal MOPA fiber laser.

In addition, the pulse waveform O4 has a half width of 500 nsec (a bottom width of 900 ms), and the pulse waveform O5 has a half width of 250 nsec. The laser light having the pulse waveform O4 was obtained by inputting a driving current of an input pulse waveform I4 (refer to FIG. 11A) to the seed laser oscillator 52, and the laser light having the pulse waveform O5 was obtained by inputting a driving current of an input pulse waveform I5 (refer to FIG. 12A) (of a shape in which the latter half of the rectangular wave is raised) to the seed laser oscillator 52. In addition, as shown in FIG. 20, the output pulse waveform O of the normal MOPA fiber laser has a shape in which the value continuously and slopingly falls from the steeply risen peak value.

Further, as evaluations for dividing performances, "fractures are exposed on the front and rear surfaces of the object," "fractures are not exposed on the front and rear surfaces of the object, and cutting is possible by expansion of the expand tape," and "cutting is impossible by expansion of the expand tape" were evaluated as dividing performances being lower in this order. The results thereof are shown in FIG. 13.

FIG. 13 is a table showing the relationship between the pulse waveforms and the dividing performances. In the table, the cases where the fractures were exposed on the front and rear surfaces of the object are shown as "FC," the cases where fractures were not exposed on the front and rear surfaces of the object, and cutting was possible by expansion of the expand tape are shown as "ST," and the cases where cutting was impossible by expansion of the expand tape are shown as "×."

As shown in FIG. 13, it was found that the dividing performances suitable for cutting were obtained independently of a pulse pitch in the pulse waveforms O1 to O4 according to the comparative example 1 and the examples 1 to 3, and on the other hand, sufficient dividing performances were not obtained in the pulse waveform O5 according to the comparative example 2. In particular, it has been confirmed that high dividing performances were obtained in the examples 1 to 3. Further, it has been confirmed that there is a trend that the dividing performance is lowered as a pulse pitch is widened.

According to the above description, it has been confirmed that a laser light having a pulse waveform in which its half width and bottom width are equal to one another (half width≈bottom width) is effective in order to improve the dividing performance. Further, it has been confirmed that the relationship between pulse waveforms of the laser lights and dividing performances specifically comes to "pulse waveforms approximate to a rectangle (the examples 1 to 3) > Gaussian pulse waveform (the comparative example 1) > waveform in which its half value is shorter than its bottom width (the comparative example 2)."

FIGS. 14A and 14B are respectively photographic diagrams showing planes of sections of the objects according to the comparative examples 1 and 2, and FIGS. 15A to 15C are respectively photographic diagrams showing planes of sections of the objects according to the examples 1 to 3. A plurality of modified spots S are formed with a pulse pitch of 5.0 µm in the object 1 in each drawing.

Figure 15:
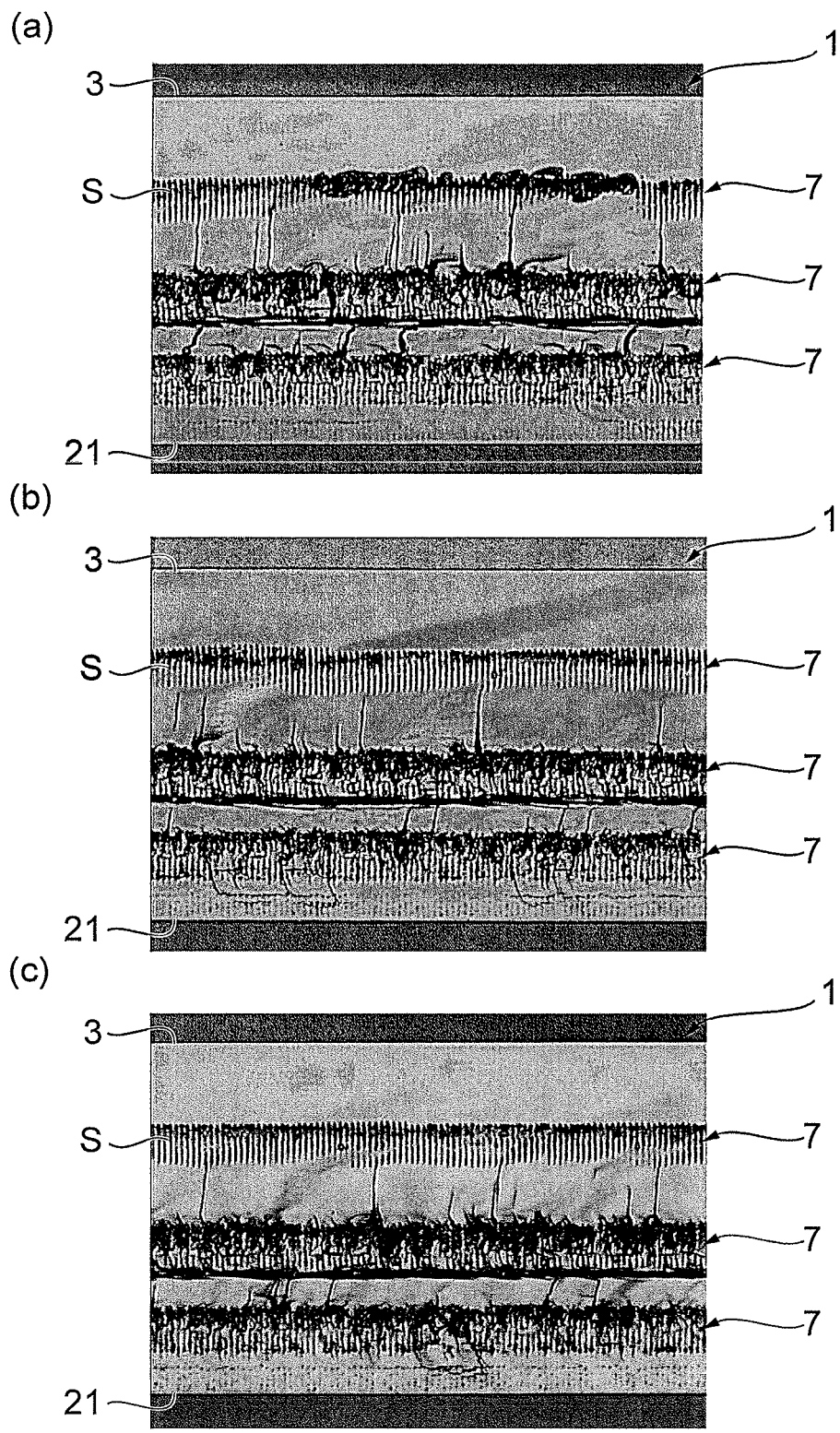
FIG. 15A is a photographic diagram showing a plane of section of the object according to an example 1.
FIG. 15B is a photographic diagram showing a plane of section of the object according to an example 2.
FIG. 15C is a photographic diagram showing a plane of section of the object according to an example 3.

As shown in FIG. 14, it was found that, in the object 1 according to the comparative examples 1 and 2, there are portions (black horizontal bands in the diagrams) in which the fractures are interrupted (do not extend), and the smoothness and quality of the planes of sections are low. On the other hand, as shown in FIG. 15, in the object 1 according to the examples 1 to 3, there are few portions in which the fractures are interrupted from the modified regions 7, and the fractures precisely extend in the thickness direction from the surface 3 to the rear surface 21, and the smoothness and quality of the planes of sections are high. Therefore, it was found that the high dividing performances are obtained in the examples 1 to 3.

In addition, in the first to third pulse waveforms O1 to O3 according to the examples 1 to 3, differences among the dividing performances are small. Therefore, it was found that, when the pulse energy is at a normal PE value with the emphasis only on the dividing performance for example, differences among the first to third pulse waveforms O1 to O3 are small.

Example B

Next, in the same way as the above-described example A except for the points that the waveform of the laser light was changed among the first to third pulse waveforms O1 to O3 according to the examples 1 to 3 described in the above-described example A, and the pulse energy was set to 12 µJ/pulse, that is a low PE value, the dividing performances of a plurality of the objects after forming the modified regions therein were evaluated.

As evaluations for dividing performances, "fractures are exposed on the rear surface of the object, or fractures are exposed on the front and rear surfaces of the object," "fractures are not exposed on the front and rear surfaces of the object, and cutting is possible by expansion of the expand tape," and "cutting is impossible by expansion of the expand tape" were evaluated as dividing performances being lower in this order. The results thereof are shown in FIG. 16.

FIG. 16 is a table showing the relationship between the pulse waveforms and the dividing performances when the pulse energy is at a low PE value. In the table, the cases where the fractures were exposed on the rear surface of the object are shown as "BHC," the cases where the fractures were exposed on the front and rear surfaces of the object are shown as "FC," the cases where fractures were not exposed on the front and rear surfaces of the object, and cutting was possible by expansion of the expand tape are shown as "ST," and the cases where cutting was impossible by expansion of the expand tape are shown as "×."

As shown in FIG. 16, it was found that the sufficient dividing performances are obtained even when the pulse energy is at a low PE value in the first pulse waveform O1 according to the example 1. Further, it was found that, when the pulse energy is at a low PE value, the differences are generated among the first to third pulse waveforms O1 to O3 according to the examples 1 to 3, and the relationship between the pulse waveforms and the dividing performances becomes "the first pulse waveform O1>the second pulse waveform O2>the third pulse waveform O3." Meanwhile, as shown in FIGS. 13 and 16, it was found that, when the pulse energy is at a low PE value, the dividing performances are lowered in any one of the first to third pulse waveforms O1 to O3 as compared with the laser processing at the normal PE value.

FIGS. 17A to 17C are respectively photographic diagrams showing planes of sections of the objects according to the examples 1 to 3 when the pulse energy is at a low PE value. In the object 1 in the diagrams, a plurality of modified spots S are formed with a pulse pitch of 3.4 µm.

As shown in FIGS. 17B and 17C, it was found that in the object 1 according to the examples 2 and 3, there are portions (black horizontal bands in the diagrams) in which the fractures are interrupted (do not extend), and the smoothness and quality of the planes of sections are low. On the other hand, as shown in FIG. 17A, in the object 1 according to the example 1, there are few portions in which the fractures are interrupted from the modified regions 7, and the fractures precisely extend in the thickness direction from the surface 3 to the rear surface 21, and the smoothness and quality of the plane of section are high. Therefore, it was found that the sufficient dividing performance is obtained in the example 1.

Example C

Next, in the same way as the above-described example A except for the points that the waveform of the laser light was changed among the first to third pulse waveforms O1 to O3 according to the examples 1 to 3 described in the above-described example A, and the pulse energy was set to 36 µJ/pulse, that is a high PE value, the dividing performances of a plurality of the objects after forming the modified regions therein were evaluated.

As evaluations for dividing performances, "fractures are exposed on the rear surface of the object, or fractures are exposed on the front and rear surfaces of the object," "fractures are not exposed on the front and rear surfaces of the object, and cutting is possible by expansion of the expand tape," and "cutting is impossible by expansion of the expand tape" were evaluated as dividing performances being lower in this order. The results thereof are shown in FIG. 18.

FIG. 18 is a table showing the relationship between the pulse waveforms and the dividing performances when the pulse energy is at a high PE value. In the table, the cases where the fractures were exposed on the rear surface of the object are shown as "BHC," the cases where the fractures were exposed on the front and rear surfaces of the object are shown as "FC," the cases where fractures were not exposed on the front and rear surfaces of the object, and cutting was possible by expansion of the expand tape are shown as "ST," and the cases where cutting was impossible by expansion of the expand tape are shown as "×."

As shown in FIG. 18, it was found that the sufficient dividing performances are obtained even when the pulse energy is at a high PE value in the third pulse waveform O3 according to the example 3. Further, it was found that, when the pulse energy is at a high PE value, the differences are generated among the first to third pulse waveforms O1 to O3 according to the examples 1 to 3, and the relationship between the pulse waveforms and the dividing performances becomes "the third pulse waveform O3>the first pulse waveform O1≈the second pulse waveform O2."

Further, it was found that, when the pulse energy is at a high PE value, there is a trend that the fractures easily extend toward the rear surface side (the opposite surface side of the laser irradiated surface) in the third pulse waveform O3, and on the other hand, the dividing performances on the rear surface side are lowered in the first and second pulse waveforms O1 and O2. Therefore, it was found that laser processing is preferably performed with a laser light having the third pulse waveform O3 in which the pulse energy is at a high PE value in order to cause BHC in the object.

Meanwhile, as shown in FIGS. 13 and 18, it was found that, when the pulse energy is at a high PE value, the dividing performances are lowered in any one of the first to third pulse waveforms O1 to O3 as compared with the laser processing at the normal PE value. Further, as shown in FIGS. 13, 16, and 18, it was found that the differences are generated in the dividing performances and the qualities among the first to third pulse waveforms O1 to O3 by changing the pulse energy, and therefore, it is important for satisfying both of the dividing performance and the quality to select an optimum pulse waveform to use according to the required quality (a sample or a scan depth, and points regarded as important for quality).

Figure 19:
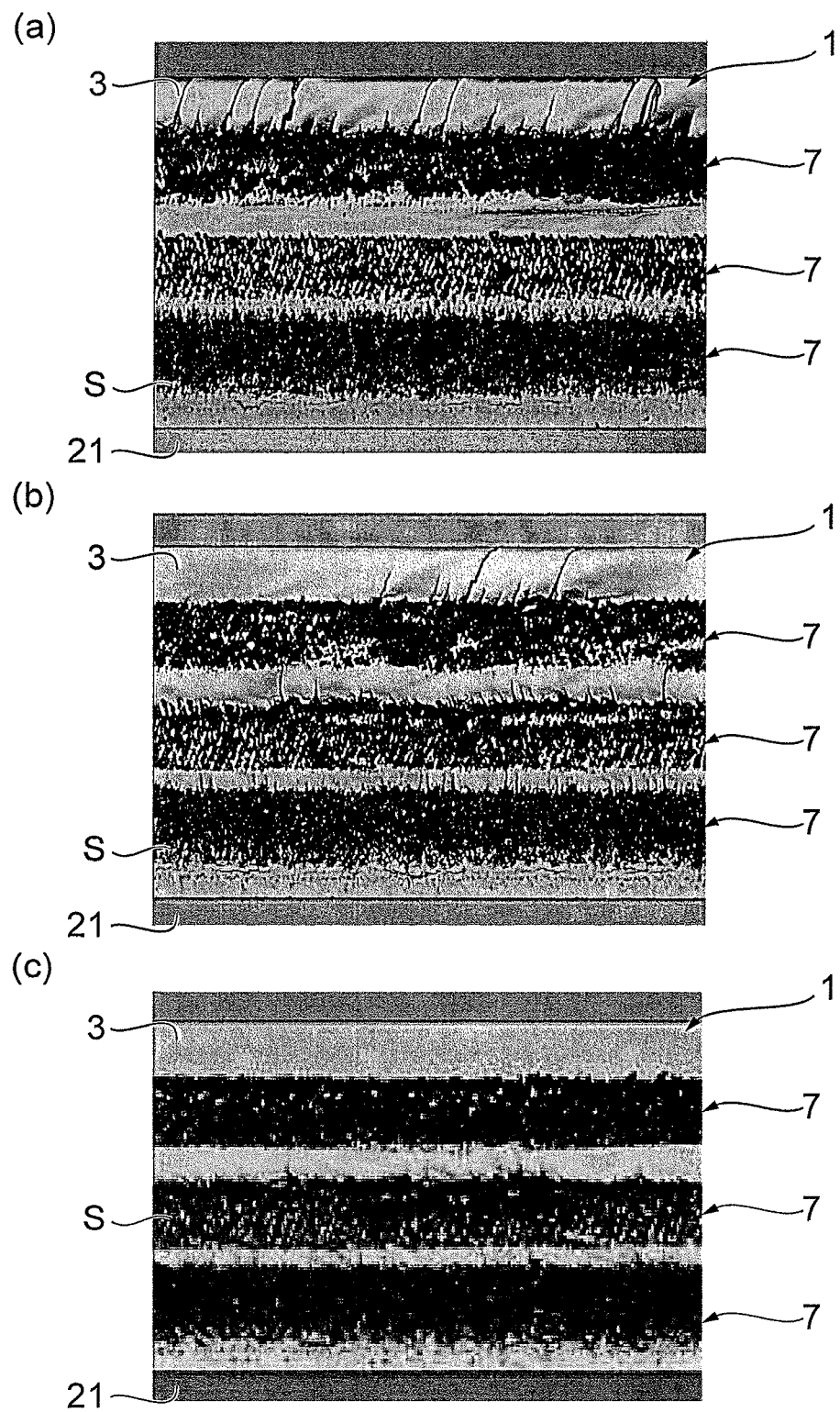
FIG. 19A is a photographic diagram showing a plane of section of the object according to the example 1 when pulse energy is at a high PE value.
FIG. 19B is a photographic diagram showing a plane of section of the object according to the example 2 when pulse energy is at a high PE value.
FIG. 19C is a photographic diagram showing a plane of section of the object according to the example 3 when pulse energy is at a high PE value.

FIGS. 19A to 19C are respectively photographic diagrams showing planes of sections of the objects according to the examples 1 to 3 when the pulse energy is at a high PE value. In the object 1 in the diagrams, a plurality of modified spots S are formed with a pulse pitch of 1.8 μm.

As shown in FIGS. 19A and 19B, it was found that, in the object 1 according to the examples 1 and 2, there are portions (black horizontal bands in the diagrams) in which the fractures are interrupted (do not extend) on the planes of sections, and the smoothness and quality of the planes of sections are low. On the other hand, as shown in FIG. 19C, in the object 1 according to the example 3, there are few portions in which the fractures are interrupted from the modified regions 7, and the fractures precisely extend in the thickness direction from the surface 3 to the rear surface 21, and the smoothness and quality of the plane of section are high. Therefore, it was found that the sufficient dividing performance is obtained in the example 3.

INDUSTRIAL APPLICABILITY

According to the present invention, it becomes possible to enhance the dividing performance according to a required quality.

REFERENCE SIGNS LIST

1 . . . Object to be processed, 3 . . . Surface, 5 . . . line to cut, 7 . . . Modified region, 21 . . . Rear surface, L . . . laser light, O1 . . . First pulse waveform, O2 . . . Second pulse waveform, O3 . . . Third pulse waveform, S . . . Modified spot, T1 to T3 . . . Peak value.

The invention claimed is:

1. A laser processing method for forming a modified region along a line to cut in an object to be processed by collecting a laser light onto the object and monitoring pulse energy, the method comprising:
a modified region forming step of forming a plurality of modified spots along the line by irradiating the object with the laser light having a pulse waveform in which its half width and a time width from a rise to a fall are equal to one another, to form the modified region with the plurality of modified spots, wherein, in the modified region forming step,
when the monitored pulse energy of the laser light is at a first value lower than a predetermined value, a first pulse waveform formed such that a peak value is located on its first half side and into a saw-blade shape is set as the pulse waveform, and
when the monitored pulse energy is at a second value higher than the predetermined value, a second pulse waveform formed such that a peak value is located on its latter half side and into a saw-blade shape is set as the pulse waveform.

2. The laser processing method according to claim 1, wherein
the first pulse waveform is a waveform which steeply rises to reach a peak value, and thereafter gradually declines, and thereafter steeply falls, and
the second pulse waveform is a waveform which steeply rises, and thereafter gradually ascends to reach a peak value, and thereafter steeply falls.

3. The laser processing method according to claim 1, wherein, in the modified region forming step,
when the monitored pulse energy is at the predetermined value, a third pulse waveform formed into a rectangular form is set as the pulse waveform.

4. The laser processing method according to claim 1, wherein, in the modified region forming step,
when the modified spots are formed on an opposite surface side of the laser light irradiated surface in the object, the pulse energy is at the first value.

5. The laser processing method according to claim 1, wherein, in the modified region forming step,
when the modified spots are formed on the opposite surface side of the laser light irradiated surface in the object, the pulse energy is at the second value.

6. The laser processing method according to claim 2, wherein, in the modified region forming step,
when the pulse energy is at the predetermined value, a third pulse waveform formed into a rectangular form is set as the pulse waveform.

7. The laser processing method according to claim 2, wherein, in the modified region forming step,
when the modified spots are formed on an opposite surface side of the laser light irradiated surface in the object, the pulse energy is at the first value.

8. The laser processing method according to claim 3, wherein, in the modified region forming step,
when the modified spots are formed on an opposite surface side of the laser light irradiated surface in the object, the pulse energy is at the first value.

9. The laser processing method according to claim 6, wherein, in the modified region forming step,
when the modified spots are formed on an opposite surface side of the laser light irradiated surface in the object, the pulse energy is at the first value.

10. The laser processing method according to claim 2, wherein, in the modified region forming step,
when the modified spots are formed on the opposite surface side of the laser light irradiated surface in the object, the pulse energy is at the second value.

11. The laser processing method according to claim 3, wherein, in the modified region forming step,
when the modified spots are formed on the opposite surface side of the laser light irradiated surface in the object, the pulse energy is at the second value.

12. The laser processing method according to claim 6, wherein, in the modified region forming step,
when the modified spots are formed on the opposite surface side of the laser light irradiated surface in the object, the pulse energy is at the second value.

13. The laser processing method according to claim 1, wherein the modified region is formed in the object through internal absorption type laser processing.

14. A laser processing method for forming a modified region along a line to cut in an object to be processed by collecting a laser light onto the object, the method comprising:
a modified region forming step of forming a plurality of modified spots along the line by irradiating the object with the laser light having a pulse waveform in which its half width and a time width from a rise to a fall are equal to one another, to form the modified region with the plurality of modified spots, wherein, in the modified region forming step, when the pulse energy of the laser light is at a first value lower than a predetermined value, a first pulse waveform formed such that a peak value is located on its first half side and into a saw-blade shape is set as the pulse waveform, when the pulse energy is at a second value higher than the predetermined value, a second pulse waveform formed such that a peak value is located on its latter half side and into a saw-blade shape is set as the pulse waveform, and when the pulse energy is at the predetermined value, a third pulse waveform formed into a rectangular form is set as the pulse waveform.

15. A laser processing method for forming a modified region along a line to cut in an object to be processed by collecting a laser light onto the object, the method comprising:

a modified region forming step of forming a plurality of modified spots along the line by irradiating the object with the laser light having a pulse waveform in which its half width and a time width from a rise to a fall are equal to one another, to form the modified region with the plurality of modified spots, wherein, in the modified region forming step, when the pulse energy of the laser light is at a first value lower than a predetermined value, a first pulse waveform formed such that a peak value is located on its first half side and into a saw-blade shape is set as the pulse waveform, when the pulse energy is at a second value higher than the predetermined value, a second pulse waveform formed such that a peak value is located on its latter half side and into a saw-blade shape is set as the pulse waveform, and when the modified spots are formed on an opposite surface side of the laser light irradiated surface in the object, the pulse energy is at the first value.

16. A laser processing method for forming a modified region along a line to cut in an object to be processed by collecting a laser light onto the object, the method comprising:

a modified region forming step of forming a plurality of modified spots along the line by irradiating the object with the laser light having a pulse waveform in which its half width and a time width from a rise to a fall are equal to one another, to form the modified region with the plurality of modified spots, wherein, in the modified region forming step, when the pulse energy of the laser light is at a first value lower than a predetermined value, a first pulse waveform formed such that a peak value is located on its first half side and into a saw-blade shape is set as the pulse waveform, and when the pulse energy is at a second value higher than the predetermined value, a second pulse waveform formed such that a peak value is located on its latter half side and into a saw-blade shape is set as the pulse waveform, when the modified spots are formed on the opposite surface side of the laser light irradiated surface in the object, the pulse energy is at the second value.

* * * * *